(12) United States Patent
Freeman et al.

(10) Patent No.: US 6,828,992 B1
(45) Date of Patent: Dec. 7, 2004

(54) USER INTERFACE WITH DYNAMIC MENU OPTION ORGANIZATION

(75) Inventors: Martin Freeman, Palo Alto, CA (US); Bonghan Cho, Mountain View, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 336 days.

(21) Appl. No.: 09/594,212

(22) Filed: Jun. 14, 2000

Related U.S. Application Data

(63) Continuation-in-part of application No. 09/434,155, filed on Nov. 4, 1999.

(51) Int. Cl.[7] .................................................. G09G 5/00
(52) U.S. Cl. ...................... 345/810; 345/733; 345/741; 345/817
(58) Field of Search ................................ 345/733, 810, 345/811, 817, 969, 970, 661, 741, 743, 744; 707/501

(56) References Cited

U.S. PATENT DOCUMENTS

| | | | | |
|---|---|---|---|---|
| 6,104,334 A | * | 8/2000 | Allport | 341/175 |
| 6,133,847 A | * | 10/2000 | Yang | 340/825.22 |
| 6,208,341 B1 | * | 3/2001 | van Ee et al. | 345/716 |
| 6,266,060 B1 | * | 7/2001 | Roth | 345/853 |
| 6,288,716 B1 | * | 9/2001 | Humpleman et al. | 345/733 |
| 6,476,825 B1 | * | 11/2002 | Croy et al. | 345/716 |

OTHER PUBLICATIONS

Billsus and Pazzani, "Learning Probabilistic User Models", May 14, 1997.

* cited by examiner

Primary Examiner—John Cabeca
Assistant Examiner—Cuong T. Thai
(74) Attorney, Agent, or Firm—Kevin Fortin

(57) ABSTRACT

A graphical user interface for a data processing device or system has a plurality of menu options arranged in multiple pages. The menu options are dynamically distributed among the pages in accordance with a user history to reduce the effort of user-navigation among the options. A dynamically adaptable GUI is relevant to remote controls, Internet portals or e-commerce sites.

2 Claims, 3 Drawing Sheets

USER INTERFACE WITH DYNAMIC MENU OPTION ORGANIZATION

RELATED APPLICATIONS

The present application is a continuation-in-part of U.S. Pat. application Ser. No. 09/434,155 filed Nov. 4, 1999, which is incorporated-herein by reference. The following patent applications are also incorporated herein by reference:

U.S. Ser. No. 09/062,364 filed Apr. 17, 1998;
U.S. Ser. No. 09/128,839 filed Aug. 4, 1998;
U.S. Ser. No. 09/129,300 filed Aug. 5, 1998;
U.S. Ser. No. 09/271,200 filed Mar. 17, 1999;
U.S. Ser. No. 09/311,128 filed May 13, 1999;
U.S. Ser. No. 09/210,416 filed Dec. 11, 1998;
U.S. Ser. No. 09/217,414 filed Dec. 21, 1998;
U.S. Ser. No. 09/544,666 filed Apr. 4, 2000;
U.S. Pat. No. 5,956,025.

FIELD OF THE INVENTION

The invention relates to user interfaces for use with data processing devices, and in particular to menu option organization within such user interfaces.

BACKGROUND ART

User interfaces (UI's), e.g., graphical user interfaces (GUI's), determine the user-friendliness and user-effectiveness of an interactive apparatus. For example, a GUI frees the user from using command languages. This is especially relevant to apparatus in the consumer electronics (CE) environment.

An example of such a CE device is the PRONTO (TM) manufactured by Philips Electronics. The PRONTO (TM) is a universal programmable remote control that was introduced into the market in September of 1998 and has most of its function selector buttons graphically displayed as menu options on a touch screen. The menu options can be distributed among several pages that are retrievable or displayable one at a time. The user can fully program the PRONTO (TM) with regard to the IR and/or RF codes assigned to hard keys and soft buttons, and with regard to what keys are accommodated on what page. More information about the PRONTO (TM) can be found at the website <http://www.pronto.philips.com>.

SUMMARY OF THE INVENTION

A drawback of a fixed graphical user interface that includes a number of pages is that the consumer may spend a great deal of time scanning through the pages trying to find a desired menu option. The PRONTO (TM) is an improvement in that the user can organize the menu options and configure the pages at will. The invention now takes this a step further and enhances the UI for the user's convenience. It is therefore one of the objects of the invention to provide a UI that is even more user-friendly.

To this end, the invention provides a device or system that comprises a UI whose operation is governed by an adapter. The adapter is configured to dynamically arrange the menu options of the UI, thereby reducing the time the user has to spend on navigation amongst the options. The term "dynamically" or "dynamic", as used herein, shall mean that options are rearranged in response to some user pattern of past activity, determined during previous operational use of the UI, without the user having to choose a menu rearrange or re-program option. According to several alternative embodiments, the user pattern is most commonly recorded in some kind of user history or profile. In a GUI comprising multiple pages, this object can be achieved, according to one embodiment, by dynamically allocating specific ones of the menu options to particular ones of the multiple pages. The invention has specific advantages within different contexts. For example, the user-friendliness of CE equipment is greatly enhanced if the user does not have to bother about menu navigation while controlling the CE equipment, especially for video, audio or multimedia, as the control aspects interfere with enjoying of, or immersion in, the entertainment.

As another example, the graphical representation of an electronic program guide (EPG) as downloaded onto the user's equipment is made more user-friendly using the invention. An EPG typically presents menu options in a grid-like overview, including channel indications and the type of content information available per channel and per time slot, and allows recording or tuning-in through a simple action by the user. The channels, time slots and or content type that score high on the scoreboard of most-frequently-used menu options are arranged in a way that reduces user-navigation, for example, by providing a graphical arrangement of the high-score options in a first panel, and the conventional EPG in another. Channel zapping, i.e., changing channels at a relatively high rate is preferably ignored in the procedure to create the customized EPG representation so as not to affect the score.

As another example, portals on the Internet can be customized so as to give the individual user rapid access to his/her preferences as derived from his/her user-history or profile. Further objects and advantages will be apparent below.

BRIEF DESCRIPTION OF THE DRAWING

The invention will now be described by way of non-limiting example with reference to the following drawings.

DETAILED DESCRIPTION OF THE PREFERRED EMBODIMENTS

Figure 1:
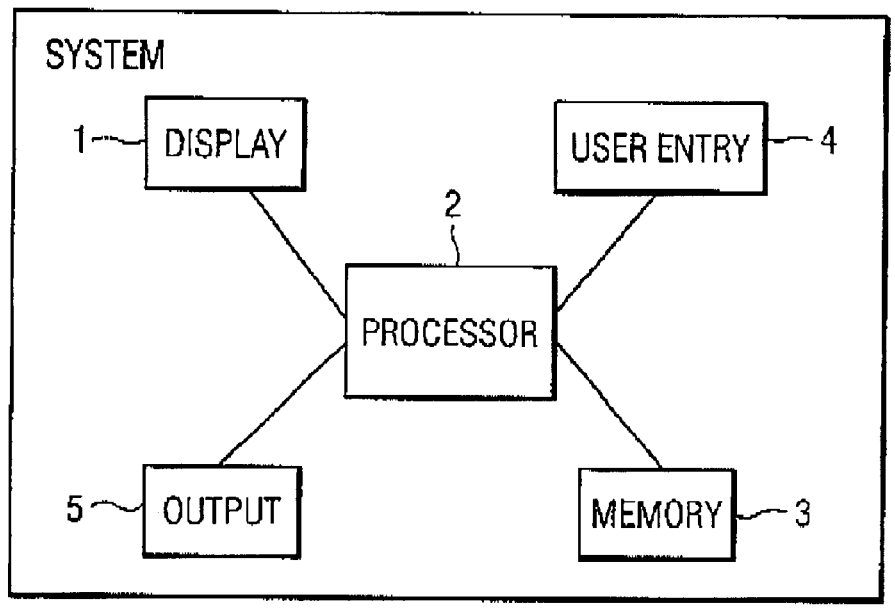
FIGS. 1 and 2 are diagrams of a device in the invention.

FIG. 1 shows a device or system on which the invention may be used. The device includes a display 1 for displaying the GUI. The display comprises a liquid crystal display (LCD or any other suitable display device. The device includes a data processor or microcontroller 2, and a memory 3, which may be volatile or non-volatile, and which contains data and/or control software. There may be plural memory devices as well. For instance, a volatile memory may contain data entered by a user and a non-volatile memory may contain control software. User entry 4 may occur via buttons (hardkeys or softkeys), voice, pointer devices, or any other appropriate mode. Alternatively, or in addition, user entry may be achieved via a touch sensitive functionality of the display 1. The device has an output, such as a control output 5. The output 5 may be an infrared (IR) or radio frequency (RF) output for remote control of CE equipment, e.g., a television set, video recorder, DVD player, and/or other apparatus. Output 5 may include a wired or wireless functionality for uploading or downloading data to or from some other data processor or from a server. The output 5 may include plural components, such as an IR transmitter and a socket for insertion of a cable for download.

Figure 2:
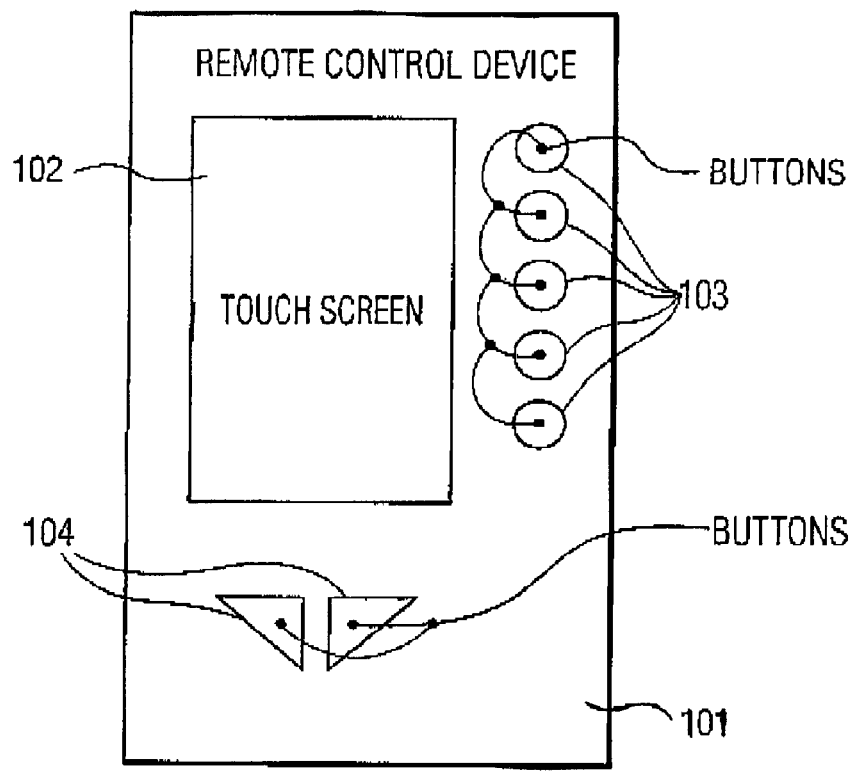

FIG. 2 is a diagram of a device 101 on which the interface of the invention may be used. Device 101 comprises a remote control, including a touch sensitive LCD screen 102, and several actuatable mechanical buttons 103 and 104. Division of functions between the displayed buttons on the screen and the mechanical buttons will be determined in accordance with the needs of the intended use of the device, and is outside the scope of the invention. In any case, at least one of the buttons, whether displayed or mechanical, will indicate switching between pages of the GUI.

The screen displays a GUI. The GUI includes menu options divided into pages. The menu options may be displayed in the form of buttons or icons, or any other suitable display format. In general, in this application, when any one of these menu option types are referred to, all are implied as possible alternatives. The term menu options, as used herein, shall also be understood to include any type of selectable interactive items.

The IR and any other outputs in this example are on side faces not visible in the view of FIG. 2. A remote control, such as the PRONTO (TM) by Philips Electronics, may have approximately the appearance of FIG. 2. Memory 3 and processor 2 for the remote of FIG. 2 are normally contained inside and therefore are generally not visible from the outside.

Figure 3:
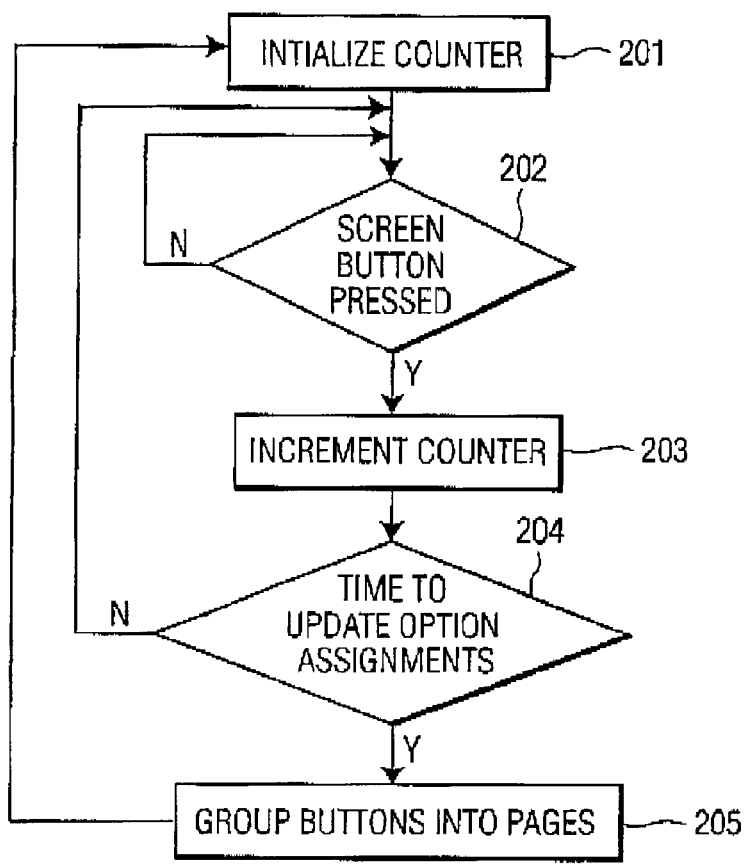
FIGS. 3 and 4 are flow diagrams illustrating a procedure for creating the GUI in the invention.

FIG. 3 shows a portion of a procedure for creating the GUI in accordance with the preferred embodiment. The portion relates to creating a user history. At 201, a counter is initialized. The counter may be an array with a respective value for each respective button. At 202, a test is performed to determine whether any screen button has been pressed. If a screen button has not been pressed, testing to detect such pressing continues. If a screen button has been pressed, a respective counter for that button is incremented at 203.

There may not be any need to keep track of how many times a mechanical button has been pressed; however, one of ordinary skill in the art may readily extend the method of the invention to changing an allocation of function between mechanical (physical) and displayed (soft) buttons, according to a user history. Such an extension may involve including, within the graphical user interface, some indication of changed function for the mechanical buttons, such as arrows pointing to those buttons, or backlighting patterns, for example.

At 204, it is tested whether to update assignments of menu options to pages. It may not be desirable to continually update this assignment, as constant movement of menu options will be bewildering to the user. Those of ordinary skill in the art might devise any number of different heuristics for selecting an update time. Examples include: when the device is powered up; after a predetermined time interval, such as an hour or a week or a month; when the count values of usage of the buttons allows for drawing statistically relevant conclusions as to which buttons are the more important ones and which ones are not; etc. Preferably, there should be an option to turn off rearrangement of the buttons, if the user is satisfied with the current button arrangement, and does not wish to have the buttons keep moving around. If it is not time to update assignments, control returns to box 202. If it is time, buttons are assigned to pages according to the user-profile. For example, the most frequently used buttons, as indicated by their counter values, are clustered and assigned to a top page.

While the above procedure has been illustrated in terms of a simple counting mechanism, more sophisticated, artificial intelligence type techniques for establishing user histories may be used. An artificial intelligence technique for compiling user histories is illustrated in D. Billsus & M. Pazzani, "Learning Probabilistic User Models", May 14, 1997. This document is available, e.g., at http://www.dkfi.uin-sb.de/~bauer/um-ws/Final-Versions/Billsus/ProbUserModels.html. The simple mechanism of the preferred embodiment is usually preferable for a consumer device such as a television remote control, because less computing power and memory will be required.

In the procedure of FIG. 3, buttons that correspond to control functions that relate to a same control context may be treated as a group and have a single counter assigned to them. For instance, it is inconvenient if the numerical TV channel buttons were assigned to different pages. Accordingly, they are preferably all treated as one button, for purposes of counting, and all assigned to the same page in a, preferably, fixed arrangement, based on their combined frequency of use.

The designer may devise other heuristics that are desirable for altering the assignment of buttons to pages, outside of pure frequency of use considerations. For instance, in a telephone with a GUI according to the invention, a button that automatically dials 911 might always be on a top page even though it is seldom used.

Figure 4:
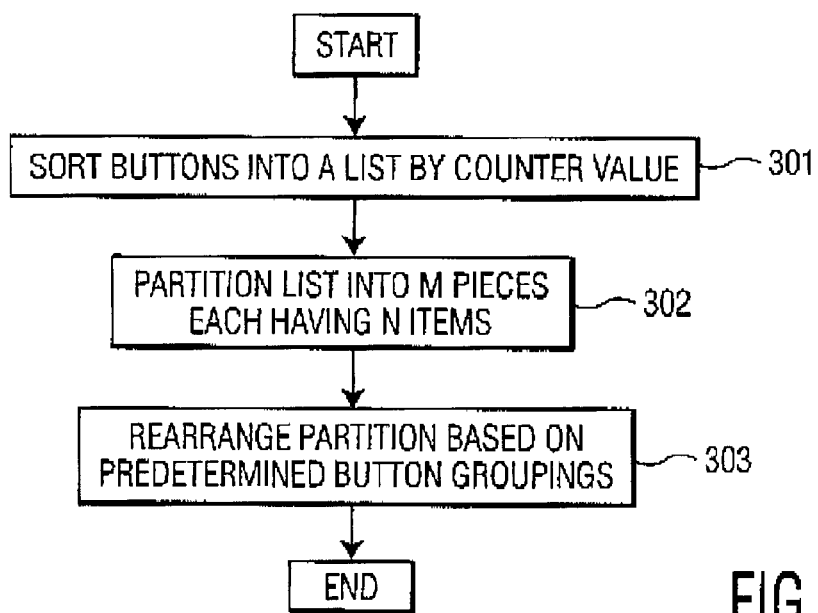

FIG. 4 illustrates box 205 in more detail. First, respective internal button representations are sorted into a list by the respective counter values. Preferably, the sort is by decreasing counts, so that the most frequently used buttons appear on the top of the list. Then, at 302, the list is partitioned into M pieces each having N items as a maximum, where N is the number of buttons which can conveniently fit on the screen and M is the number of pages available in the GUI. Then, if any of the grouped buttons will not fit onto a screen, the buttons may have to be rearranged on the pages so that they fit at 303. Alternatively, if the buttons were not grouped for counting, they may be rearranged at this time, according to any pre-determined grouping. Alternatively, if some of the buttons have different sizes on the display, then some of the pages may have different numbers of buttons, or buttons can be resized.

The same remote may be used by multiple-individual users, such as family members. Each user may have different preferences with regard to button arrangement. One user may surf the channels using the scan keys, while another may use the numerical channel buttons. One user may frequently use a VCR, while another may seldom do so. One user may use the PIP button frequently, while another may not.

Preferably, the remote has a different button configuration for each user. Accordingly, there is preferably some mechanism for identifying the current user. This mechanism may be a button on the top page of the GUI, or external identification apparatus, such as: a biometrics system, e.g. a voice print or a finger print; or a user personal identification number (PIN). Normally, a remote for use with in home consumer electronics devices requires a lower level of security than some other devices. For instance, a PDA or cell phone might require higher security, because the consequences of breach of security are more severe. An example of a low level of security might be a one digit PIN.

The user history according to the invention will normally be stored in a memory, e.g. reference 3 of the device of FIG.

1 or 2. The memory for storing the user history may be volatile or non-volatile. If the memory is volatile, provision may be made for uploading the user history to a device with a non-volatile memory, such as a PC. For instance, a socket could be provided on a remote, per FIG. 2, for connecting a cable to the PC for upload. In such case, software should be provided on the PC for accepting the upload.

Software for effecting the procedures of FIGS. 3 and 4 may similarly be stored in a memory 3 of the device of FIG. 1 or 1. The software will preferably be stored in a non-volatile memory. Alternatively, the procedures may be executed in specialized hardware, such as a gate array, within the device.

Figure 5:
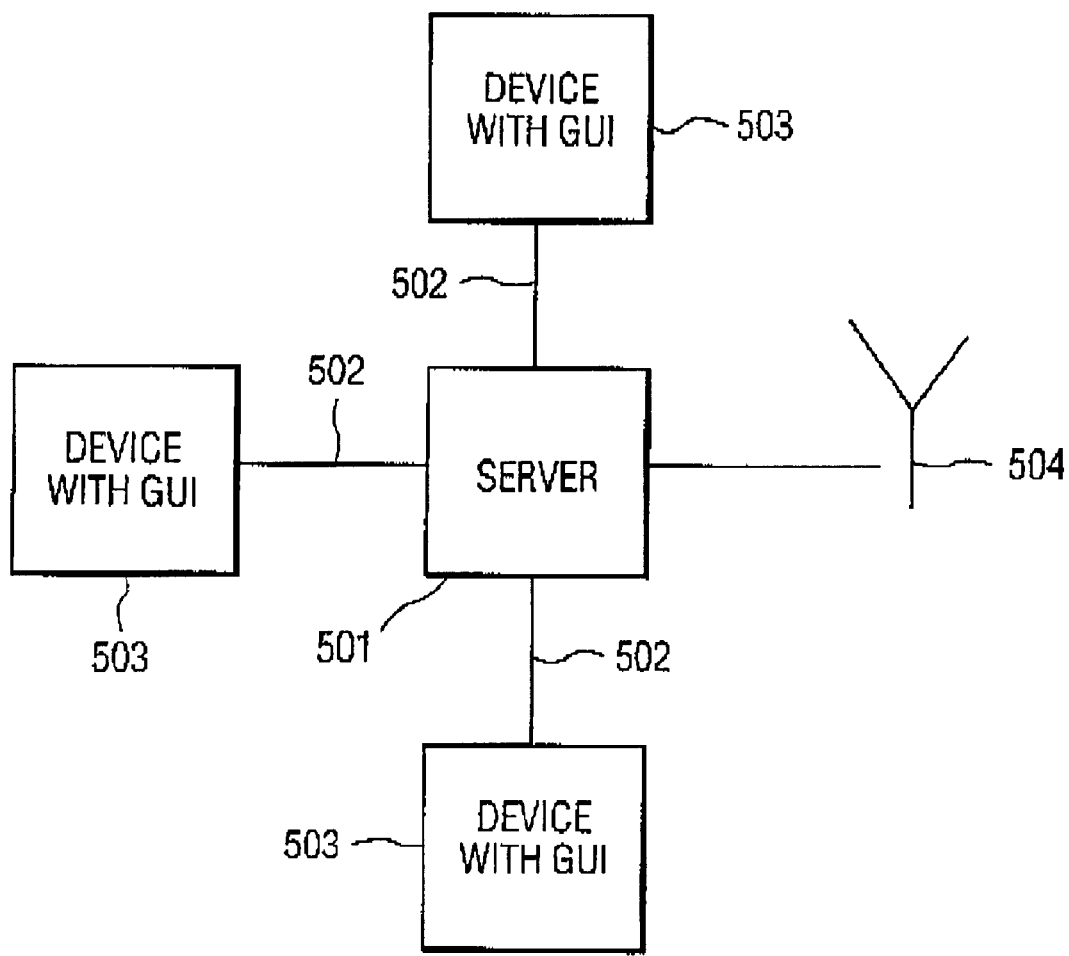
FIG. 5 is a diagram of a server architecture for use with the invention.

FIG. 5 shows a server architecture for use with the invention. A server 501 is adapted to effectuate the dynamic updates of GUI's on devices such as 503. The server 501 may contain software or hardware adapted to perform the steps of FIGS. 3 and 4. Devices 503 may be of any type shown or discussed with reference to FIGS. 1 and 2. The server communicates with the devices via network connections 502, 504, which may be wired or wireless. The wireless connection 504 may communicate with a further device 503, not shown. The network connections may be over the Internet or internal connections such as LAN's or a home network. The server 501 and devices 503 preferably all contain local memory and some input and output devices, as shown in FIG. 1.

Within this context, reference is made to co-pending U.S. Pat. application Ser. No. 09/434,155 mentioned above. This patent document relates to a remote control device that initiates retrieval of a pre-defined control configuration from a repository. For example, a reference or default control mode is backed up so that the user can always return to a reference configuration without too much effort. This default or reference mode is either stored in the remote by the manufacturer or retailer, or it comprises a user-programmed configuration that is downloaded from the device to an external repository, e.g., the user's PC, for retrieval later on when desirable in a communication procedure initiated by the remote. Alternatively, or subsidiarily, the apparatus to be controlled serves as a repository for the control configuration of the apparatus itself. The remote retrieves the configuration from the apparatus if and when needed. In this manner the remote is made highly user-friendly and truly universal, serving as a mobile interface to nearby equipment.

Now, in the current invention, the user-profiles themselves can be made a component of the, control configuration downloadable from the apparatus to be controlled or, e.g., from a home server. The user-profile information based on the operational use of the remote by a specific user determines the distribution of the menu options in the GUI for use by this specific user. By having this profile made an integral part of the downloadable control configuration of an apparatus, a cluster of apparatus or an entire home network, user-friendliness is increased as the individual user is taken into consideration. Accordingly, the hand-held device may not even need the onboard counters. The counting functionality and configuration of the pages can then be done at the server, based on the counter values registered at the server. The reconfigured pages or control codes for the reconfiguration are then sent back to the device.

When running the procedures of FIGS. 3 & 4, the processor 2 or the server 501 functions as an adapter to reconfigure the GUI.

What has been discussed above with respect to a hand-held remote control device is also useable within a different context, namely that of a GUI for a web-site. Consider a site on the world wide web that is the major starting site for users when they get connected to the web. Such a site is commonly referred to as a "portal" or "gateway". Examples of such portals are the ones from Yahoo, Excite, AOL, and Lycos. Typically, such a site offers a plurality of services of various categories. The services are represented as icons or clickable links arranged in a menu, e.g., a linear menu with a hierarchy of options under each option in the main menu. An individual user is typically interested in only specific ones of the services and among them, only in specific sub-categories. For example, a specific user is mainly interested in "books", "hardware tools", "science", "nature" and "toys", but not in "stocks" or "movies" or "politics". Under "nature" the user is especially interested in "marine mammals". Under "toys" the user is mainly interested in "model trains" and there only in the category "O-scale engine models". Based on the interaction history of this specific user with the server providing the portal site, the server creates a personalized representation of the portal by arranging the icons or links in the hierarchical menu in such a way that the navigation effort for this particular user is reduced while getting to his/her most frequently used categories or sub-categories. For example, sub-categories in the relevant pull-down menu are arranged in the order of most-frequently used ones for this specific user. The portal or home page, or a portion thereof, is customized for each user individually from a kit of appropriate parts (advertisement banners, collection of hyperlinks, ornamental aspects, etc.) supplied by the server and based on the profile or user-history of the user. The profile may also include information from the accessing client device identifying its capabilities and configuration. Within this context, reference is made to U.S. Ser. No. 08/785,459 filed Jan. 17, 1997 for Mehran Moshfeghi, Jun Wang, Stephen Wong and Yuan-Pin Yu for A METHOD FOR PERSONALIZING HOSPITAL INTRANET WEB SITES, herein incorporated by reference. This patent document relates to a system wherein a web server is accessible by a web browser via a network, wherein the presumed needs, declared and/or logged topics of interests, access rights to information and environments of users are taken into account in presenting web pages to a user's web browser. Web pages are created dynamically based on the user's relationship to the institution or the patient, and the users function or job, and information access privileges. Furthermore the web pages are created dynamically based on the capabilities of the users' computers, computer bandwidth connection, display characteristics, browser capabilities, etc. In order to achieve this the web server has to be supplied with information about the user and the user's environment. This information can be obtained with the use of web forms, automatic detection of the IP address of the requesting client, server-browser communication, smart cards and/or active badges. Information about user preferences, user's physical and computer environment, and usage profile can be stored at the server. The server can then use all this information to generate personalized content.

The invention can also be used on a Web site for e-commerce. For example, the site enables a user to browse through various categories of books or music, the titles and bibliographic information of which are organized in a hierarchical manner wherein, for example, a category at a higher level has multiple sub-categories. The site is personalized by having the user's favorite categories more readily accessible than others in terms of the number of user interactions needed to get to the information. Again, this is achieved through user-profiling or a user-history, preferably after notifying the user that the GUI has been modified to provide a better service.

From reading the present disclosure, other modifications will be apparent to persons skilled in the art. Such modifications may involve other features which are already known in the design, manufacture and use of graphical user interfaces and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during-the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements.

What is claimed is:

1. A data processing system comprising:
   a display with a graphical user interface (GUI) for enabling user interaction with a plurality of menu options; and
   an adapter for automatically and dynamically arranging the menu options in the GUI to reduce user-navigation among the options, wherein
   the adapter is capable of respective arrangements of the menu options for respective individual ones of multiple users,
   the GUI comprises a user identity selector for enabling the adapter to discriminate between the multiple users, and
   the user identity selector comprises respective user-selectable representations for respective ones of the multiple users in a predetermined location on the display.

2. A data processing system comprising:
   a display with a graphical user interface (GUI) for enabling user interaction with a plurality of menu options; and
   an adapter for automatically and dynamically arranging the menu options in the GUI to reduce user-navigation among the options, wherein
   the GUI comprises multiple pages,
   the adapter dynamically arranges specific ones of the menu options to particular ones of the multiple pages, and
   the adapter allocates first and second ones of the menu options as a group to a single one of the multiple pages.

* * * * *

(12) EX PARTE REEXAMINATION CERTIFICATE (8862nd)
United States Patent
Freeman et al.

(10) Number: US 6,828,992 C1
(45) Certificate Issued: Feb. 21, 2012

(54) USER INTERFACE WITH DYNAMIC MENU OPTION ORGANIZATION

(75) Inventors: Martin Freeman, Palo Alto, CA (US); Bonghan Cho, Mountain View, CA (US)

(73) Assignee: Koninklijke Philips Electronics N.V., Eindhoven (NL)

Reexamination Request:
No. 90/011,042, Jun. 15, 2010

Reexamination Certificate for:
Patent No.: 6,828,992
Issued: Dec. 7, 2004
Appl. No.: 09/594,212
Filed: Jun. 14, 2000

Related U.S. Application Data

(63) Continuation-in-part of application No. 09/434,155, filed on Nov. 4, 1999, now abandoned.

(51) Int. Cl.
*H04B 1/20* (2006.01)

(52) U.S. Cl. .................. 715/810; 715/733; 715/741; 715/817

(58) Field of Classification Search .................. None
See application file for complete search history.

(56) References Cited

To view the complete listing of prior art documents cited during the proceeding for Reexamination Control Number 90/011,042, please refer to the USPTO's public Patent Application Information Retrieval (PAIR) system under the Display References tab.

*Primary Examiner* — Salman Ahmed

(57) ABSTRACT

A graphical user interface for a data processing device or system has a plurality of menu options arranged in multiple pages. The menu options are dynamically distributed among the pages in accordance with a user history to reduce the effort of user-navigation among the options. A dynamically adaptable GUI is relevant to remote controls, Internet portals or e-commerce sites.

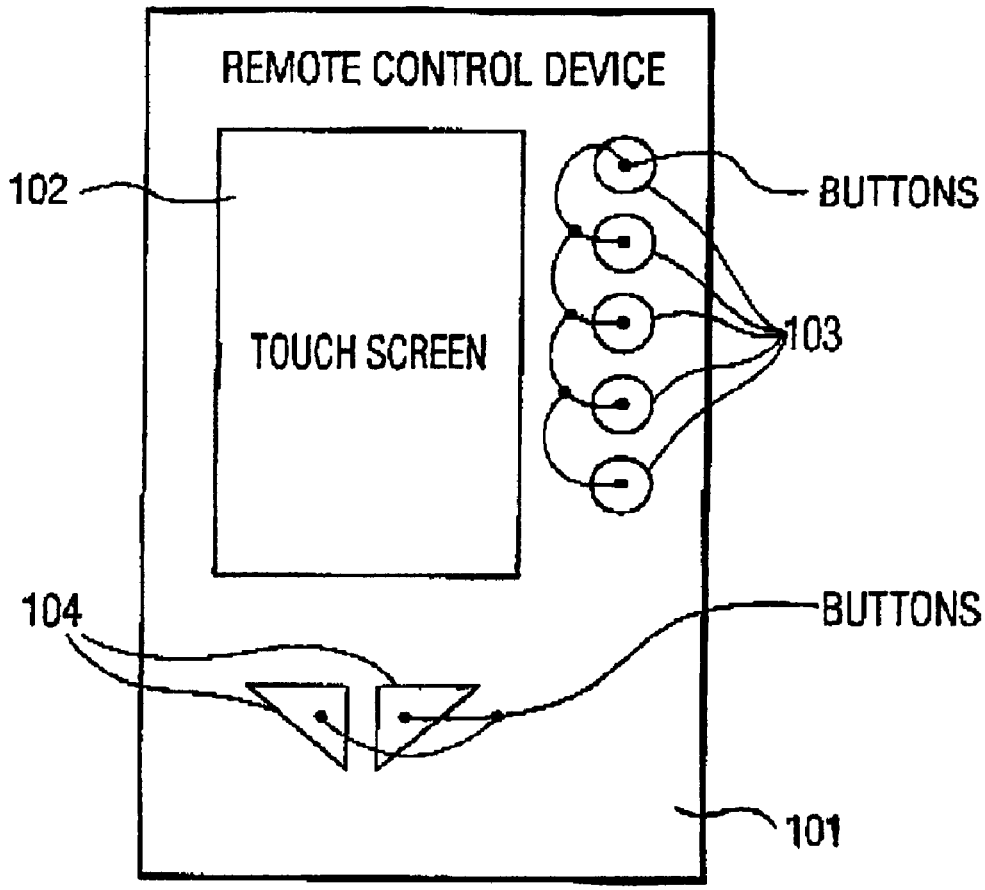

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is determined to be patentable as amended.

Claim 1 was not reexamined.

2. A data processing system comprising:

a display with a graphical user interface (GUI) for enabling user interaction with a plurality of menu options *displayed on multiple pages*; and an adapter for automatically and dynamically [arranging] *rearranging* the *plurality of* menu options [in the GUI] to reduce user-navigation among the *plurality of menu* options, wherein [the GUI comprises multiple pages,] the adapter dynamically [arranges] *rearranging* specific ones of the *plurality of* menu options *displayed on different multiple pages* to particular ones of the multiple pages, and [the adapter allocates first and second] *related* ones of the *plurality of* menu options *displayed on different multiple pages* as a group to a single one of the multiple pages.

\* \* \* \* \*